Aug. 24, 1965  R. D. BROWN  3,202,349
MACHINE FOR AND METHOD OF ACCOUNTING
Filed March 5, 1963  2 Sheets—Sheet 1

Inventor:
Raymond D. Brown,
by Russell, Chittick & Pfund
Attorneys

Aug. 24, 1965     R. D. BROWN     3,202,349
MACHINE FOR AND METHOD OF ACCOUNTING
Filed March 5, 1963     2 Sheets-Sheet 2
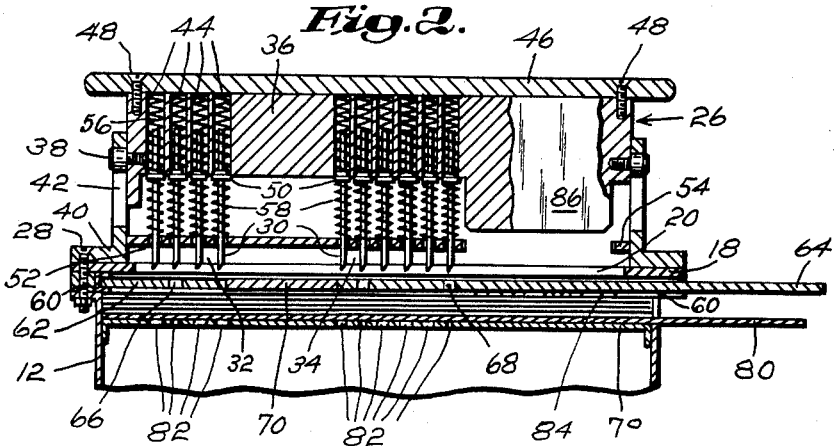
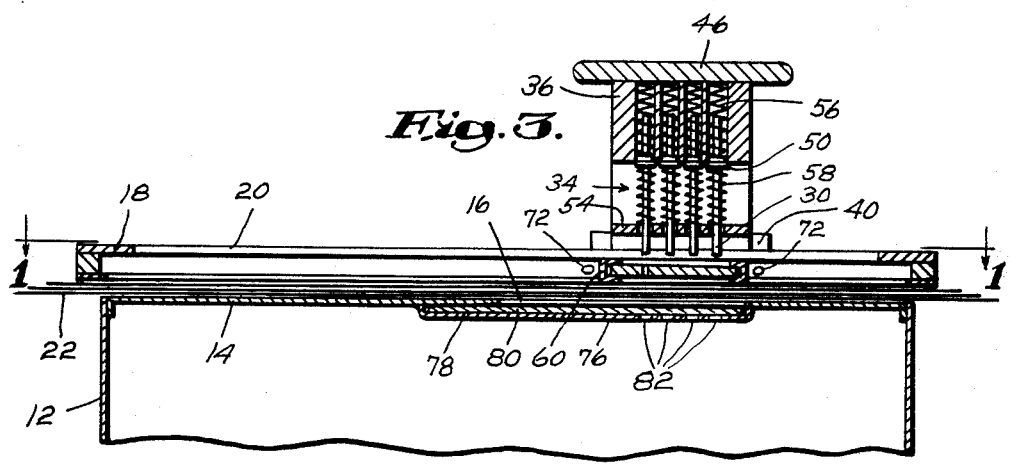
Inventor:
Raymond D. Brown,
by Russell, Chittick & Pfund
Attorneys 3,202,349
MACHINE FOR AND METHOD OF
ACCOUNTING
Raymond D. Brown, Hollis, N.H., assignor to Royal Business Forms Incorporated, Nashua, N.H., a corporation of New Hampshire
Filed Mar. 5, 1963, Ser. No. 262,991
7 Claims. (Cl. 234—45)

This invention relates to an accounting machine and a method of accounting, and more particularly to an autographic register and the method of using the register in an accounting system.

The autographic register is used by many businesses to provide the customers with an addressed, dated and itemized receipt while at the same time producing one or more copies of the customer's receipt for use by the business in its billing, shipping, inventory control, etc. Normally, at the end of a billing period, the customer's individual purchases for the period are totaled and billed on a single bill which is then sent to the customer. For a large number of businesses, the periodic collation and totaling of separate receipt copies for every customer is an inefficient, tedious and expensive method of billing. A large percentage of the hand labor involved in this method of billing can be eliminated by the use of machine processed data cards containing all of the relevant information concerning a particular transaction. However, to fully realize the advantages of centralized automatic data card processing and billing, the punched data cards should be produced contemporaneously with the issuance of the customer's itemized receipt.

Accordingly, it is an object of the present invention to provide an autographic register which produces a punched, machine processed, data card containing relevant information about a particular transaction.

It is another object of the invention to provide an autographic register which permits the simultaneous marking of a machine processed data card and manifolded business forms.

It is still another object of the invention to provide an autographic register modified to receive a punched store and customer's plate containing information to be transferred to a machine processed data card.

It is a further object of the invention to provide a method of producing punched data cards for centralized machine processing of individual customer accounts.

These and other objects of the invention will appear from the following detailed description taken in conjunction with the accompanying drawings wherein:

FIG. 2 is a view in cross section taken on line 2—2 of FIG. 1 showing the relationship of the multi-bladed punch, the store and customer plates, the manifolded business forms, and the machine processed data card; and FIG. 3 is a view in cross-section taken on line 3—3 of FIG. 1 showing the same components as FIG. 2, but from a different perspective.

Figure 1:
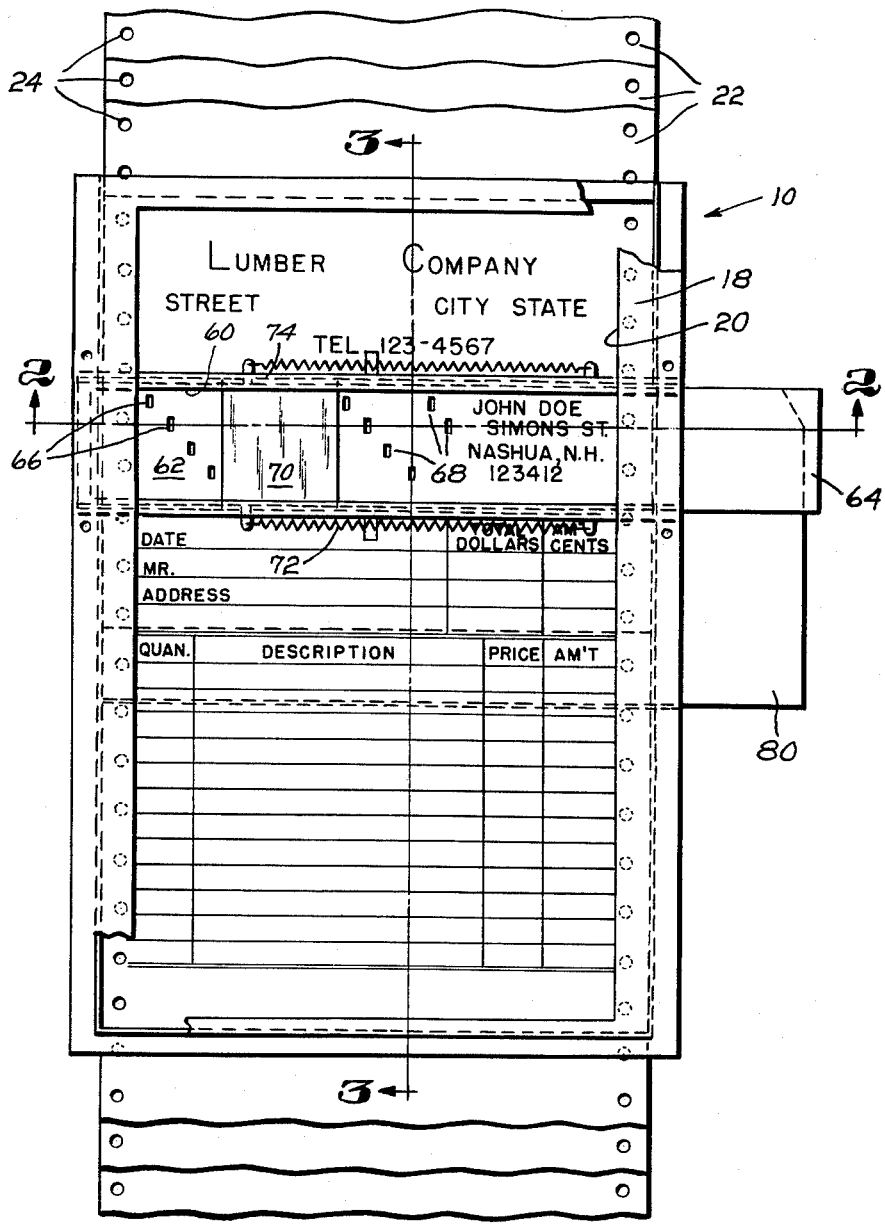
FIG. 1 is a plan view of a modified autographic register showing the machine processed data card, manifolded business forms and the store and customer plates positioned thereover.

Turning now to the drawings, the major components of the modified autographic register are best shown in FIGS. 2 and 3. The autographic register, indicated generally as 10, has a base 12 upon which is mounted a writing plate 14. The writing plate 14 is provided with an aperture 16 extending across substantially the entire width of the writing plate, but occupying only a portion of the length thereof. A cover plate 18, having an aperture 20, the dimensions of which are only slightly less than the dimensions of the writing plate 14, is positioned a small distance above the writing plate. The cover plate aperture 20 provides an access for writing upon manifolded business forms 22 which are positioned between the writing plate 14 and cover plate 18. The manifold business forms 22 may be printed on No Carbon Required paper or may be interleaved with carbon paper to produce multiple copies of the information written on the uppermost form.

The autographic register 10 has a drive system (not shown) to intermittently advance and position, by means of sprocket holes 24, a fresh set of business forms beneath the writing aperture 20, as shown in FIG. 1. The drive system is normally hand actuated by turning a crank (not shown) located on the side of the autographic register 10. When the crank is turned, the marked business forms are ejected from the writing position beneath cover plate aperture 20 and a fresh set of business forms is positioned thereunder. One or more of the ejected forms can then be torn from the set of marked forms and given to the customer as a receipt.

A punch mechanism, indicated generally as 26, is mounted on the cover plate 18 to overlie the cover and writing plate apertures 20 and 16, respectively. The punch mechanism 26 is secured to both the cover plate 18 and the base 12 by means of screws 28, one of which is shown in FIG. 2.

The punch mechanism 26 holds two sets of punch blades 30 which for convenience are designated as the "store" and "customer" punch blade sets 32 and 34, respectively. The "customer" set 34 contains twenty-four blades while the "store" set 25 is limited to sixteen blades because usually more information, such as, name, address, account number, etc., will have to be punch coded for a customer than for a store. The number of blades 30 in each set, however, may be varied to accommodate the individual requirements of each business and customer.

A blade housing 36 is trunnion mounted by screws 38 in supporting brackets 40 to permit vertical movement within the supporting bracket slots 42 and pivotal movement around the axis of the trunnion screws 38. The blade housing 36 is drilled to provide a series of cylindrical punch blade channels 44 which extend through the housing 36 from top to bottom. The upper ends of the punch blade channels 44 are closed by a pressure distribution plate 46 which is secured to the top surface of the blade housing 36 by screws 48. Each punch blade 30 has a shoulder 50 located intermediate the ends thereof and dimensioned to slide freely within the cylindrical channels 44. The punch blades 30 are mounted in channels 44 so that the shoulders 50 are positioned within the lower opening of the cylindrical channel 44. The lower portion of each punch blade 30 extends downwardly through a series of guide holes 52 cut in a guide plate 54. The guide plate 54 and the walls of the cylindrical channels 44 maintain the punch blades 30 in a vertical position and restrict their movement to a substantially vertical direction.

The punch blades 30 are spring loaded between the pressure distribution plate 46 and the guide plate 54 by upper and lower springs 56 and 58, respectively. The upper springs 56 surround the top portion of the punch blades 30 within cylindrical blade channels 44 and exert an expansive force against the pressure distribution plate 46 and the blade shoulders 50, while the lower springs 58 exert a similar force on shoulders 50 and the guide plate 54.

Referring now to FIGS. 1 and 3, a track 60, substantially U-shaped in plan and cross section, is positioned immediately below the cover plate 18 and extends across the width of the autographic register 10. The track 60 is designed to receive a "store" plate 62 and a "customer" plate 64 which are inserted in the track 60 and positioned beneath the "store" and "customer" punch blades respectively, as shown in FIGS. 1, 2 and 3. The "store" and "customer" plates 62 and 64 are punched in a predetermined code with the punched holes 66 in the "store" plate normally representing such items as store name, address, account number, etc., while the "customer" plate holes 68 indicate name, address, phone and/or account number of any other relevant information.

Looking again at FIG. 1, a spring tensioned stop plate 70 is slidably mounted within track 60 between the "store" and "customer" plates 62 and 64, respectively. The springs 72 of the stop plate 70 keep the stop plate positioned directly beneath the "customer" blades 34 as long as the "customer" plate 64 is not inserted in track 60. With the stop plate 70 located beneath the "customer" blades 34, the "customer" blades are rendered inoperative even though the punch mechanism 26 is accidently depressed.

The "store" plate 62 is inserted in track 60 through either of the slots 74 located in the side walls of track 60. Once the "store" plate 62 has been inserted in track 60, it will normally not be removed unless the data punched into the "store" plate 62 requires reversion or the autographic register is transferred to another store. The "customer" plates 64, however, are frequently inserted and withdrawn from the autographic register because each customer has a separate plate. To facilitate the easy and rapid insertion and withdrawal of the "customer" plate 64, the track 60 is open at one end as shown in FIG. 1. When the "customer" plate 64 is inserted in track 60, the stop plate 70 is pushed from beneath the "customer" punch blades 34 and into contact with the "store" plate 62 thereby preventing any further insertion of the "customer" plate 64. The widths of the "store" plate 62 and the stop plate 70 are preselected so that when the plates are in contact, the punched holes 68 in the "customer" plate 64 are aligned with the "customer" punch blades 34. The "customer" plate 64 is held in contact with the side walls of the track 60 by frictional engagement which is sufficient to overcome the expulsive force exerted by springs 72 on the stop plate 70 and "customer" plate 64.

Continuing descriptively in a downward direction, the manifolded business forms 22 underlie the "store" and "customer" plates 62 and 64 and rest upon the writing plate 14. A generally shallow U-shaped punch die 76 is secured to the lower surface of the writing plate 14 and forms a flat bedded trough 78 extending across both the width and length of the writing plate aperture 16 and continuing under a portion of the writing plate 14 in its long dimension. A machine processed data card 80 is inserted in the trough 78 formed by the punch die 76 and positioned beneath the business forms 22, the "store" and "customer" plates 62 and 64 and the punch mechanism 26 is ascending order.

The modified autographic register 10 is operated by pressing down on the movable punch mechanism 26 thereby forcing the "store" and "customer" punch blades 32 and 34 downwardly against the "store" and 'customer" plates 62 and 64. Since both of the plates have prepunched data holes 66 and 68, only those punch blades corresponding in position to the prepunched holes will pass through the respective plates to punch similar holes in the business forms 22 and a machine processed data card 80. The punch die 76 is provided with a series of holes 82 to permit the punch blades 30 to continue downwardly through the die thereby producing clear edged holes in the data card 80.

In actual use, the sequence of operations for the modified autographic register 10 is quite simple. A fresh set of business forms 22 is moved into position underneath the cover plate writing aperture 20 by turning the drive system crank handle of the autographic register 10. A new data card 80 and "customer" plate 64 are then inserted in the trough 78 and the track 60 respectively. The forms 22 and data card 80 are now ready to be punched, however, the store clerk may prefer to make the necessary written entries on the uppermost business form before operating the punch mechanism 26. If this be the case, then the prices and description of the items purchased are listed on the form in the designated areas and the total amount of the purchase is entered in the appropriate dollars and cents columns of the form as shown in FIG. 1.

If the customer has forgotten his "customer" plate 64, his name and address can be written on the uppermost form in the space provided, as shown in FIG. 1. It should be noted that since the business forms 22 are interleaved with carbon paper or are printed on NCR paper, the customer's name and address will be duplicated on the underlying forms as well as on the data card 80.

After the relevant information has been written on the uppermost business form, the punch mechanism 26 is depressed thereby transferring the punched data from the "store" and "customer" plates 62 and 64 to the business forms 22 and the machine processed data card 80. The crank handle is again turned this time to eject the punched and marked forms while also positioning a new set of business forms beneath the cover plate writing aperture 29. One or more of the marked forms can then be given to the customer as his receipt.

Even though the customer has brought his "customer" plate 64, it may be desirable to have his name and address intelligibly marked on the data card 80 and one or more of the business forms 22 in addition to the machine coded punched holes. In another embodiment of the invention, the "customer" plate 64 is modified to print the customer's name and address on the data card 80 and the business forms 22 when the punch mechanism 26 is depressed by the store clerk. As shown in FIG. 2, the bottom surface of the "customer" plate 64 is embossed with raised letters and/or figures 84 which normally would spell out the customer's name and address and any other information which might be desired by the store. The embossed indicia 84 are positioned on the "customer" plate 64 so that they underlie the downwardly extending leg 86 of the blade housing 36 when the "customer" plate 64 is fully inserted in track 60. As the punch mechanism 26 is depressed, the blade housing leg 86 forces the "customer" plate 64 into contact with the manifolded business forms 22. Further downward travel of the punch mechanism 26 will impress the configuration of the embossed indicia 84 on the uppermost business form thereby pressure printing the other NCR forms and the data card 80. This system does not print the uppermost form, however, since that form is usually given to the customer there is no need to print it with the customer's name and address.

The data cards 80 prepared in the above manner are periodically collected by the organization which will do the billing for the store. Operatives of this organization will then additionally punch into each card the date, the dollar amount of that particular transaction and other pertinent required information that has been written on the forms and card. At the end of the month, all of the cards may then be fed through an IBM or similar machine to sort out and collect all of the cards of each customer of each store and then print on the store's billhead the customer's name and address and an itemized list of the transactions during the month. This is machine totaled so that the amount due from each customer is then known. The bills may be sent direct to the customers by the accounting organization or may be returned to the store to be used in their accounting procedures before being mailed.

Obviously the disclosed features of the modified autographic register can be changed and adapted to various specific embodiments without departing from the scope of the invention as defined in the appended claims. Having thus described and disclosed the preferred embodiments of my invention, what I claim as new and desire to secure by Letters Patent of the United States is:

1. An autographic register comprising: a writing plate having an opening thereacross; a plurality of superimposed forms resting on said plate and extending across said opening; a transversely extending trough positioned below said opening to receive a data card; means located over said forms and said card to receive, in parallel relationship thereto, a customer plate having predetermined holes cut therein; punches positioned above the location of said customer plate and limited to vertical movement relative thereto whereby when said punches are depressed they will pass through the holes in the customer plate and make corresponding holes in the forms and the card; and other punches laterally spaced from the customer plate and limited to vertical movement relative thereto for simultaneously punching other predetermined holes in said forms and said card.

2. An autographic register comprising: a writing plate having an opening thereacross; a plurality of superimposed forms resting on said plate and extending across said opening; a transversely extending trough positioned below said opening to receive a data card; means located over said forms and said card to receive, in parallel relationship thereto, a customer plate and a store plate, said plates having predetermined holes cut therein; punches positioned above the location of said customer plate and limited to vertical movement relative thereto whereby when said punches are depressed they will pass through the holes in the customer plate and make corresponding holes in the forms and the card; and other punches laterally spaced from the customer plate and positioned above the location of said store plate, said other punches being limited to vertical movement relative to said store plate whereby when said other punches are depressed they will pass through the holes in the store plate and make corresponding holes in the forms and the card.

3. An autographic register comprising: a writing plate having an opening thereacross; a plurality of superimposed forms resting on said plate and extending across said opening; a transversely extending trough positioned below said opening to receive a data card; means located over said forms and said card to receive, in parallel relationship thereto, a customer plate and a store plate, said plates having predetermined holes cut therein; a first set of punches positioned above the location of said customer plate and limited to vertical movement relative thereto; movable stop means positioned under said punches to prevent the operation thereof prior to the insertion of said customer plate in said customer plate receiving means; and a second set of punches movable only with said first set of punches and laterally spaced from the customer plate and positioned above the location of said store plate, said second set of punches being limited to vertical movement relative to said store plate whereby when said punches are depressed they will pass through the holes in the customer plate and the store plate and make corresponding holes in the forms and the card.

4. An autographic register comprising: a writing plate having an opening thereacross; a plurality of superimposed NCR forms resting on said plate and extending across said opening; a transversely extending trough positioned below said opening to receive a data card; means located over said forms and said card to receive, in parallel relationship thereto, a customer plate having predetermined holes cut therein and predetermined indicia embossed on the undersurface thereof and a store plate having predetermined holes cut therein; punches positioned above the location of said customer plate and limited to vertical movement relative thereto whereby when said punches are depressed they will pass through the holes in the customer plate and make corresponding holes in the forms and the card; means for forcing said embossed indicia into pressure contact with said forms when said punches are depressed whereby the forms underlying the uppermost form and the data card are printed with indicia corresponding to said embossed indicia; and other punches laterally spaced from the customer plate and positioned above the location of the store plate, said punches being limited to vertical movement relative to said store plate whereby when said other punches are depressed they will pass through the holes in the store plate and make corresponding holes in the forms and the card.

5. A method of accounting utilizing a machine generally of the autographic register type comprising the steps of: positioning a data card under a plurality of superimposed autographic register forms; positioning a punched customer plate over the forms and the data card; punching holes in the forms and the data card in accordance with the punchings in the customer plate while simultaneously punching other holes in the forms and the data card differing from the punchings in the customer plate; and marking with a writing implement on the top form other information which will be duplicated on the underlying forms and the data card while said forms and data card are in punching position.

6. A method of accounting utilizing a machine generally of the autographic register type comprising the steps of: positioning a data card under a plurality of superimposed autographic register forms; positioning a punched customer plate having embossed indicia on the undersurface thereof above the forms and the data card; punching holes in the forms and the data card in accordance with the punchings in the customer plate while simultaneously punching other holes in the forms and the data card differing from the punchings in the customer plate and at the same time pressing the embossed indicia into the top to print corresponding indicia on the underlying forms and the data card; and marking with a writing implement on the top form other information which will be duplicated on the other forms and the data card while said forms and data card are in punching position.

7. A method of accounting utilizing a machine generally of the autographic register type comprising the steps of: positioning a data card under a plurality of superimposed autographic register forms; positioning a punched customer plate above the forms and the data card; positioning a punched store plate above the forms and the data card; punching holes in the forms and the data card in accordance with the punchings in the customer plate while simultaneously punching other holes in the forms and the data card corresponding to the punchings in the store plate; and marking with a writing implement on the top form other information which will be duplicated on the other forms and the data card while said forms and data card are in punching position.

References Cited by the Examiner

UNITED STATES PATENTS

| 2,803,187 | 8/57 | Hart et al. | 234—76 |
| 2,909,221 | 10/59 | Hopp | 234—76 |
| 2,988,985 | 6/61 | Minardi et al. | 234—77 |
| 2,994,473 | 8/61 | Farmer et al. | 234—45 |
| 3,007,630 | 11/61 | Jones | 234—77 |
| 3,008,633 | 11/61 | Pennington | 234—77 |
| 3,082,941 | 3/63 | Volk | 234—45 |
| 3,124,302 | 3/64 | Arnett et al. | 234—45 |

ANDREW R. JUHASZ, *Primary Examiner.*